Patented Aug. 22, 1933

1,923,490

UNITED STATES PATENT OFFICE 1,923,490

MANUFACTURE OF A NEW CRYSTALLIZED PRODUCT FROM DIGITALIS

Walter Kreis, Basel, Switzerland, assignor to the firm of Chemical Works Formerly Sandoz, Basel, Switzerland No Drawing. Application February 19, 1931, Serial No. 517,125, and in Germany March 1, 1930

5 Claims. (Cl. 87—28)

The present process relates to the manufacture of a new crystallized product from digitalis.

According to the process described in the present specification, fresh or dried and again moistened leaves of digitalis are submitted to an exhaustive extraction with such organic solvents that are not miscible with water, such as methyl and ethyl acetate, methylethylacetone, chloroform and others, in presence of a sufficient amount of suitable easily water soluble salts, such as ammonium sulphate, magnesium sulphate, sodium chloride, calcium chloride, sodium nitrate, sodium nitrite, primary sodium phosphate and others.

The extract thus obtained is then evaporated in vacuo at a low temperature and the residue treated with ether, whereby the cardio-active glucosides are precipitated in form of their tannoids and the main part of inactive substances such as chlorophyll and others remain in the solution. The precipitate obtained in this way is filtered, treated once more with ether and advantageously dissolved in an aqueous alcohol. This solution is then treated with tannin precipitating substances which liberate the glucosides and also eliminate impurities in form of an easily filtrable precipitate. After filtration the solution is partly evaporated at a low temperature in order to eliminate the alcohol, whereby the difficultly soluble part of the mixture of glucosides precipitates and may be easily obtained in a pure form by recrystallizing it from methyl alcohol for instance.

The separation of the glucosides in a difficultly and an easily soluble part may also be carried out by treating with water the mixture of the tannoids which has already been subjected to a purification by means of ether, whereby only the easily soluble fraction of the tannoids is dissolved. The treatment with tannin precipitating substances is then only carried out with the difficultly soluble part of the tannoids.

By using as starting material for instance the leaves of digitalis lanata, a new crystallized product which has until now not been described in the literature may be prepared. It crystallizes from methyl alcohol in form of beautiful thin prisms which sometimes are of one centimeter length. Its cardio-active effect, examined by toxicological tests on frogs and cats, is quantitatively equal to that of digitoxine, but qualitatively somewhat different. In this chemical properties digitoxine is distinctly different from the new product prepared as above described. Digitoxine possesses, according to modern literature [Cloetta, Arch. exp. Pathol. Pharmakol. 88, (1920) 120; Windaus, Ber. 61, 2437 (1928)], a carbon content of 64,1% and a hydrogen content of 8,6%, whereas the analysis of the new product has given a value of 59.2 to 60,8% for carbon and of 7.9—8,3% for hydrogen. The solubility of the new crystallized substance in methyl alcohol is about 5 times, and in 80% alcohol about 3 times greater than that of digitoxine cryst. Merck. In water the new product dissolves much easier than digitoxine, whilst in acetic ester and in chloroform digitoxine is better soluble compared to the new preparation.

A great difference exists further in the optical behaviour of 4% solutions in diethyleneoxide Digitoxine cryst. Merck:

$$[\alpha]_D^{20} = +8°$$

New product:

$$[\alpha]_D^{20} = +25°$$

The Keller's color reaction, carried out by underlaying with concentrated sulphuric acid a solution of the glucoside in glacial acetic acid containing ferric chloride, yields as it is well known with digitoxine in the glacial acetic acid a bluish green coloration while in the concentrated sulphuric acid a pure brown shade appears. The new product yields in the glacial acetic acid the same color as the digitoxine, but in the sulphuric acid a red brown shade. The corresponding aglucones show by the Keller's color reaction a more distinct difference. According to Cloetta (Arch. exp. Pathol. Pharmacol. 88, 232, 1920) digitoxigenine yields at the contact surface of the liquids a yellow ring and colors the glacial acetic acid in a grass-green shade. The crystallized aglucone of the new product yields contrarily to that at the surface of contact a red ring, the glacial acetic acid remaining uncolored.

A comparison with other well known crystallized glucosides obtained from digitalis is in so far superfluous, as all these products possess a much smaller activity on the heart and also quite different properties.

The process above described can be carried out with leaves of all species of digitalis.

The following examples, without being limitative, illustrate this process, the parts being by weight.

Example 1

2000 parts of dry leaves of digitalis lanata are finely ground with 500 parts of sodium chloride, wetted with 1000 parts of water and extracted with 30000 parts of chloroform. The filtered extract is completely evaporated in vacuo at a low temperature and to the remaining residue are added 1000 parts of dry ether and the whole mixture is left so long under the ether until the thick viscous mass has been transformed into a hard body. The ether is then poured away and the residue is digested with 1000 parts of ether about 2 hours long under reflux condenser. After cooling down, the mixture is filtered and the residue obtained, which is now in form of a brittle mass, dried in vacuo in order to completely eliminate the present ether, and then pulverized. The treatment with ether is advantageously once more repeated with the pulverized mass. The thus obtained yellow greenish powder is then dissolved in 1000 parts of methylalcohol and to the solution obtained is added under stirring a fine suspension of 30 parts of lead hydroxide in 1000 parts of water.

The solution obtained is neutralized, stirred about 2 hours, filtered and the clear yellowish filtrate is preferably treated again with a small quantity of a tannin precipitating substance. The clear filtrate thus obtained is concentrated in vacuo at a low temperature to about 200 parts whereby the difficulty soluble part of the glucoside mixture precipitates. Thereupon the solution is filtered, the precipitate dissolved in a small quantity of methylalcohol and treated with a small quantity of water whereby the new product begins to precipitate in a crystalline form. By repeated crystallization from methylalcohol without addition of water the glucoside may be obtained in form of a perfectly pure compound; it does not change its properties even on further recrystallization.

Example 2

8000 parts of fresh leaves of digitalis lanata are reduced in small pieces in presence of 6000 parts of ammonium sulphate, the pap thus obtained is strongly pressed and extracted under stirring with 30,000 parts of acetic ester. The filtered extract is completely evaporated in vacuo at a low temperature, treated with 1000 parts of dry ether and worked up in the same way as described in Example 1.

Example 3

2000 parts of dry leaves of digitalis lanata are finely ground together with 1000 parts of ammonium sulphate, introduced in 30,00 parts of acetic ester, and 1000 parts of water are slowly added thereto under good stirring. The mass obtained is then extracted during 15 hours. The filtered extract is completely evaporated in vacuo at a low temperature and the residue treated with ether in the same way as described in Example 1. The product obtained in this way is mixed with 1000 parts of water; to the mixture obtained are added 8 parts of a saturated sodium chloride solution and the mass is allowed to stand for half an hour. The undissolved part of the tannoids is separated by centrifugation from the solution and dissolved again in 500 parts of alcohol. To the solution thus obtained is then added a fine suspension of 20 parts of lead hydroxide in 500 parts of water, the solution is neutralized, stirred for about 2 hours, filtered and the filtrate preferably treated with a small amount of a tannin precipitating substance and filtered again. The clear filtrate obtained is then evaporated at a low temperature in vacuo and the residue recrystallized several times first from methyl alcohol containing water and later on several times from methyl alcohol alone.

What I claim is:—

1. A process for the preparation of a crystallized product from digitalis, comprising the steps of subjecting water-containing leaves of digitalis to an exhaustive extraction with organic solvents non miscible with water in presence of easily water soluble salts, filtering and completely evaporating at a low temperature the extract thus obtained, precipitating the mixture of glucosides in form of tannoids by treating the residue with ether, filtering the precipitate produced, digesting it with ether, filtering again and dissolving the precipitate obtained in a mixture consisting of about equal parts of water and of an organic solvent selected from the class comprising methanol, ethyl alcohol and acetone, treating the solution with tannin precipitating agents in order to eliminate the tannic acid and the impurities, filtering the glucoside-containing solution and concentrating it until the difficultly soluble part of the mixture of glucosides precipitates, separating it from the liquor and recrystallizing the product thus obtained from a suitable solvent.

2. A process for the preparation of a crystallized product from digitalis, comprising the steps of reducing to small pieces leaves of digitalis in presence of easily water-soluble salts, moistening the pulverulent product obtained, subjecting same to an exhaustive extraction with organic solvents nonmiscible with water, filtering and completely evaporating at a low temperature the extract thus obtained, precipitating the mixture of glucosides in form of tannoids by treating the residue with ether, filtering the precipitate produced, digesting it with ether, filtering again and dissolving the precipitate obtained in a mixture consisting of about equal parts of water and of an organic solvent selected from the class comprising methanol, ethyl alcohol and acetone, treating the solution with tannin precipitating agents in order to eliminate the impurities, filtering the glucoside-containing solution and concentrating it until the difficultly soluble part of the glucoside mixture precipitates, separating it from the liquor and recrystallizing the product thus obtained from a suitable solvent.

3. A process for the preparation of a crystallized product from digitalis, comprising the steps of reducing to small pieces fresh leaves of digitalis in presence of easily water-soluble salts, subjecting the product obtained to an exhaustive extraction with organic solvents non miscible with water, filtering and completely evaporating at a low temperature the extract thus obtained, precipitating the glucoside mixture in form of tannoids by treating the residue with ether, filtering the precipitate produced, digesting with ether, filtering again and dissolving the precipitate obtained in a mixture consisting of about equal parts of water and of an organic solvent selected from the class comprising methanol, ethylalcohol and acetone, treating the solution with tannin precipitating agents in order to eliminate the impurities, filtering the glucoside-containing solution and concentrating it until the difficultly soluble part of the glucoside mixture precipitates, separating it from the liquor and recrystallizing the product thus obtained from a suitable solvent.

4. A process for the preparation of a crystallized product from digitalis lanata, comprising the steps of reducing to small pieces fresh leaves of digitalis lanata in presence of easily water soluble salts, subjecting the product obtained to an exhaustive extraction with organic solvents non miscible with water, filtering and completely evaporating at a low temperature the extract thus obtained, precipitating the glucoside mixture in form of tannoids by treating the residue with ether, filtering the precipitate produced, digesting it with ether, filtering again and dissolving the precipitate obtained in a mixture consisting of about equal parts of water and of an organic solvent selected from the class comprising methanol, ethylalcohol and acetone, treating the solution with tannin precipitating agents in order to eliminate the impurities, filtering the glucoside-containing solution and concentrating it until the difficultly soluble part of the glucoside mixture precipitates, separating it from the liquor and recrystallizing the product thus obtained from a suitable solvent.

5. The crystallized cardio-active product from digitalis, which in dry state constitutes a pure white product crystallizing from methanol in form of uniform long, thin, colorless prisms and which on repeated recrystallization does not change its properties, which crystals, when heated in a capillar tube, begin to sinter at 225° C. and melt under decomposition at 245—248° C., one part of which is soluble at ordinary temperature in about 20 parts of methyl alcohol, in about 300 parts of chloroform and in about 10.000 parts of water and nearly insoluble in ether, and which possesses in a 4% solution of diethyleneoxide a rotation power of $$[\alpha]_D^{20} = +24 - 25°$$

and which contains 59,2—60,8% of carbon and 7,9—8,3% of hydrogen and yields by the Keller's color reaction in the upper part of the separation surface of the acids a bluish-green coloration, while in concentrated sulphuric acid there appears a red-brown shade, which is composed of 1 molecule of aglucone, 3 molecules of digitoxose, 1 molecule of glucose and 1 molecule of acetic acid and contains therefore on each molecule of aglucone 4 molecules of hexose combined therewith, whereas the known crystallized digitalis glucosides contain only 3 molecules of hexose on each molecule of aglucone, which gives on careful hydrolysis with dilute mineral acids about 38% of a sugar-free product (aglucone) composed of a mixture of three crystallized aglucones, namely of digitoxigenin, gitoxigenin and digoxigenin, and as sugar-component about 30% of digitoxose and about 32% of a well crystallized, until now unknown disaccharide $C_{12}H_{22}O_9$ having reductive properties and which further contains 6% of acetic acid.

WALTER KREIS.